United States Patent
Anderson et al.

(10) Patent No.: US 8,020,295 B2
(45) Date of Patent: Sep. 20, 2011

(54) METHODS FOR DIMENSIONALLY RESTORING A FASTENER FOR A GAS TURBINE ENGINE

(75) Inventors: Derek W. Anderson, Cromwell, CT (US); Allen W. Brown, Wethersfield, CT (US)

(73) Assignee: United Technologies Corp., Hartford, CT (US)

( * ) Notice: Subject to any disclaimer, the term of this patent is extended or adjusted under 35 U.S.C. 154(b) by 508 days.

(21) Appl. No.: 11/874,315

(22) Filed: Oct. 18, 2007

(65) Prior Publication Data

US 2009/0104003 A1 Apr. 23, 2009

(51) Int. Cl.
*B23P 6/00* (2006.01)
(52) U.S. Cl. ...... 29/889.1; 29/90.7; 29/402.01; 29/402.08; 72/53; 156/94; 411/411
(58) Field of Classification Search ...... 29/90.7, 29/889.1, 889.7, 402.1, 402.8, 402.01, 402.08; 72/53; 411/411; 451/28; 470/11; 156/94; 403/408.1; 74/569; 123/90.54
See application file for complete search history.

(56) References Cited

U.S. PATENT DOCUMENTS

| | | | |
|---|---|---|---|
| 3,818,525 A * | 6/1974 | Bedi | 470/11 |
| 4,861,618 A | 8/1989 | Vine et al. | |
| 5,312,650 A | 5/1994 | Dalal et al. | |
| 5,735,044 A | 4/1998 | Ferrigno et al. | |
| 5,908,522 A * | 6/1999 | Lofstrom et al. | 156/94 |
| 6,154,959 A | 12/2000 | Goodwater et al. | |
| 6,233,822 B1 | 5/2001 | Grossklaus, Jr. et al. | |
| 6,729,288 B2 * | 5/2004 | Yamamoto et al. | 123/90.54 |
| 6,793,457 B2 | 9/2004 | Caddell et al. | |
| 6,905,308 B2 | 6/2005 | Hagle et al. | |
| 7,017,793 B2 | 3/2006 | Kinstler | |
| 7,060,366 B2 | 6/2006 | Gupta et al. | |
| 7,121,758 B2 * | 10/2006 | McMillan et al. | 403/408.1 |
| 7,216,428 B2 | 5/2007 | Memmen et al. | |
| 7,244,320 B2 | 7/2007 | Malley et al. | |

* cited by examiner

*Primary Examiner* — Rick K Chang

(57) ABSTRACT

Gas turbine engines systems and related methods involving dimensionally restored fasteners are provided. In this regard, a representative method for dimensionally restoring a mechanical fastener for a gas turbine engine includes: providing a mechanical fastener; and relocating existing material of the fastener such that a dimension of the fastener is restored.

18 Claims, 3 Drawing Sheets

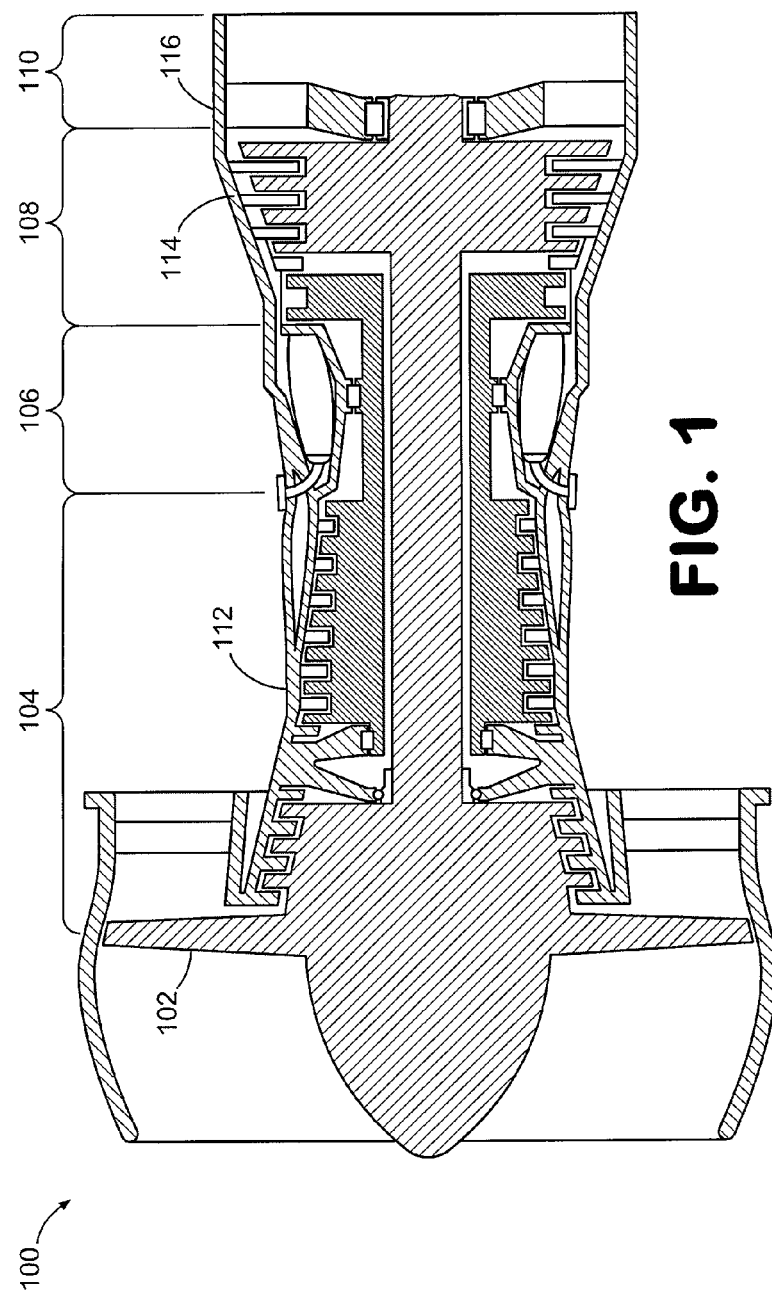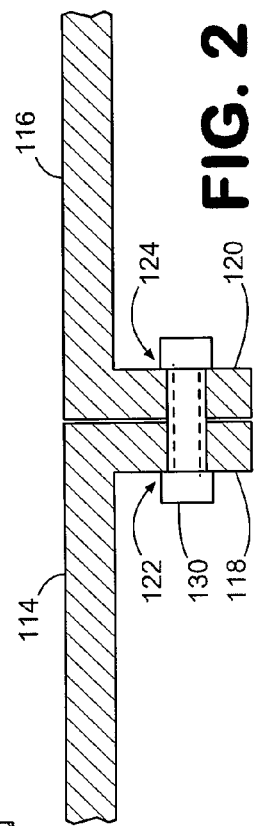

METHODS FOR DIMENSIONALLY RESTORING A FASTENER FOR A GAS TURBINE ENGINE

BACKGROUND

1. Technical Field

The disclosure generally relates to gas turbine engines.

2. Description of the Related Art

Engine casings of gas turbine engines typically incorporate multiple cases that are secured together to house the various components of the engine. By way of example, a typical gas turbine engine casing can include cases for each of the high-pressure turbine, low-pressure turbine, high-pressure compressor, low-pressure compressor and exhaust sections. Maintaining the cases in fixed positions relative to each other typically is accomplished by use of mechanical fasteners that are designed to prevent the cases from clocking during engine operation.

SUMMARY

Gas turbine engines systems and related methods involving dimensionally restored fasteners are provided. In this regard, an exemplary embodiment of a method for dimensionally restoring a mechanical fastener for a gas turbine engine comprises: providing a mechanical fastener; and relocating existing material of the fastener such that a dimension of the fastener is restored.

An exemplary embodiment of a method for repairing a gas turbine engine comprises: removing a fastener from the gas turbine engine; relocating existing material of the fastener such that a dimension of the fastener is restored; and reinstalling the fastener in the gas turbine engine.

An exemplary embodiment of a fastener for a gas turbine engine comprises a dimensionally restored exterior surface comprising original material of the fastener and lacking build-up material.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

FIG. 1 is a schematic diagram depicting an exemplary embodiment of a gas turbine engine.

FIG. 2 is a partially cut-away, schematic diagram depicting a portion of the engine casing of FIG. 1.

DETAILED DESCRIPTION

Figure 3:
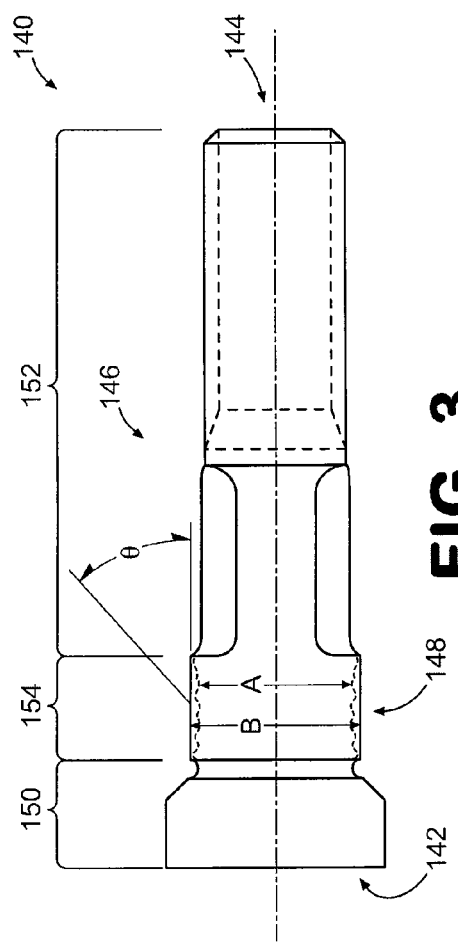
FIG. 3 is a schematic diagram depicting an exemplary embodiment of a dimensionally restored bolt.

Gas turbine engines systems and related methods involving dimensionally restored fasteners are provided, several exemplary embodiments of which will be described in detail. In this regard, some embodiments involve the use of worn fasteners (e.g., bolts and studs) that no longer satisfy dimensional characteristics for joining adjacent cases of an engine casing. Such a fastener is dimensionally restored by reshaping at least a portion of an exterior surface of the fastener. In some embodiments, reshaping is accomplished by grit blasting at least a portion of the exterior surface in order to relocate existing material of the fastener to satisfy the dimensional requirements.

FIG. 1 is a schematic diagram of a gas turbine engine 100. Engine 100 incorporates a fan 102, a compressor section 104, a combustion section 106, a turbine section 108 and an exhaust section 110. Although depicted in FIG. 1 as a turbofan gas turbine engine, there is no intention to limit the concepts described herein to use with turbofans as other types of gas turbine engines can be used.

The various sections of the engine incorporate corresponding components that are generally housed within an engine casing 112. Notably, the engine casing is formed of multiple cases that are attached to each other. By way of example, engine casing 112 includes a turbine casing 114 that is attached to an exhaust casing 116.

Attachment of the turbine casing and exhaust casing is depicted in detail in FIG. 2. As shown in FIG. 2, case 114 terminates in an annular flange 118, and case 116 includes an annular flange 120. Notably, the flanges are annular in shape, with each of the flanges incorporating an annular arrangement of corresponding apertures. In FIG. 2, corresponding apertures 122 and 124 are depicted.

Attachment of the cases 114, 116 to each other is facilitated by inserting a mechanical fastener through each of the corresponding apertures. By way of example, a fastener 130 is inserted into corresponding apertures 122, 124. The ability of the mechanical fasteners to maintain fixed positions of the cases 114 and 116 relative to each other is largely dependent upon the dimensions of the exterior portions of the fasteners that physically contact the corresponding apertures. That is, any gaps between the apertures and the fasteners can enable movement of the casings. As is known, dimensions of the apertures and/or fasteners can vary over time.

In this regard, reference is made to the schematic diagram of FIG. 3, which depicts an exemplary embodiment of a mechanical fastener configured as a bolt. Generally, bolt 140 includes first and second end portions 142, 144 and an intermediate portion 146 located therebetween. Notably, the intermediate portion includes a contact portion 148 that is received by corresponding flange apertures of engine cases that are to be fixed in position relative to each other.

Prior to a restoration process (an exemplary embodiment of which will be described later), the intermediate portion exhibits an exterior dimension generally represented by the dashed lines, with a nominal diameter A. After the restoration process, however, the fastener exhibits the restored dimension with a nominal diameter B.

With respect to dimensional restoration, an embodiment of such a method can involve relocating material of the fastener to positions that restore desired dimensional characteristics of the fastener. In this regard, material can be moved to positions along the contact portion of a fastener so that the desired exterior dimension is exhibited. In some embodiments, the method can involve grit blasting the material of the fastener until the material located at the contact portion extends to the desired diameter.

For restoring the embodiment of FIG. 3, such a method can involve masking areas outside the intermediate portion (e.g., masking areas 150, 152) and leaving portion 154 unmasked.

The material associated with the unmasked portion then can be repositioned. In some embodiments, grit blasting can be used, whereas in other embodiments, various other techniques, such as shot peening can be used. Notably, the fastener can be formed of various materials, such as nickel-based or titanium-based alloys.

With respect to grit blasting, such blasting can be performed manually or with varying degrees of automation. Various blasting pressures can be used with a pressure setting of a blast-type machine being set between approximately 15 PSI (103.4 kPa) and approximately 35 PSI (241.3 kPa), preferably between approximately 20 PSI (137.9 kPa) and approximately 30 PSI (206.8 kPa).

Various types of grit and grit sizes also can be used. By way of example, an aluminum oxide grit can be used with a grit size of between approximately 50 and 70 grit, preferably between approximately 55 and approximately 65 grit, and most preferably 60 grit. Various incident angles with respect to the surface being dimensionally restored also can be used. By way of example, some embodiments can use an incident angle ($\theta$) of between approximately 300 and approximately 90°, preferably between approximately 45° and approximately 75°. Clearly, various grit blast parameters can be chosen based upon one or more of a variety of factors, such as the material composition of the component being blasted, and the degree of dimensional restoration desired.

Figure 4:
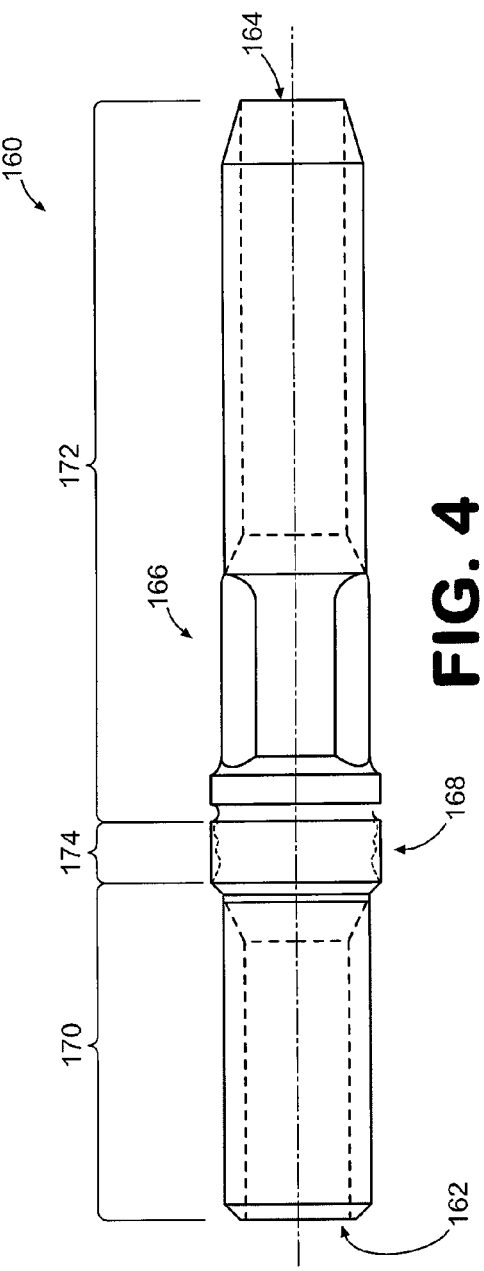
FIG. 4 is a schematic diagram depicting an exemplary embodiment of a dimensionally restored stud.

Another embodiment of a representative mechanical fastener is depicted schematically in FIG. 4. As shown in FIG. 4, the fastener 160 is configured as a stud that generally includes first and second end portions 162, 164 and an intermediate portion 166 located therebetween. Similar to the exemplary restoration method described before with respect to the embodiment of FIG. 3, restoration of the embodiment of FIG. 4 can involve masking areas of the fastener other than the area associated with a contact portion 168. By way of example, areas 170, 172 can be masked, whereas area 174 can be left unmasked.

Figure 5:
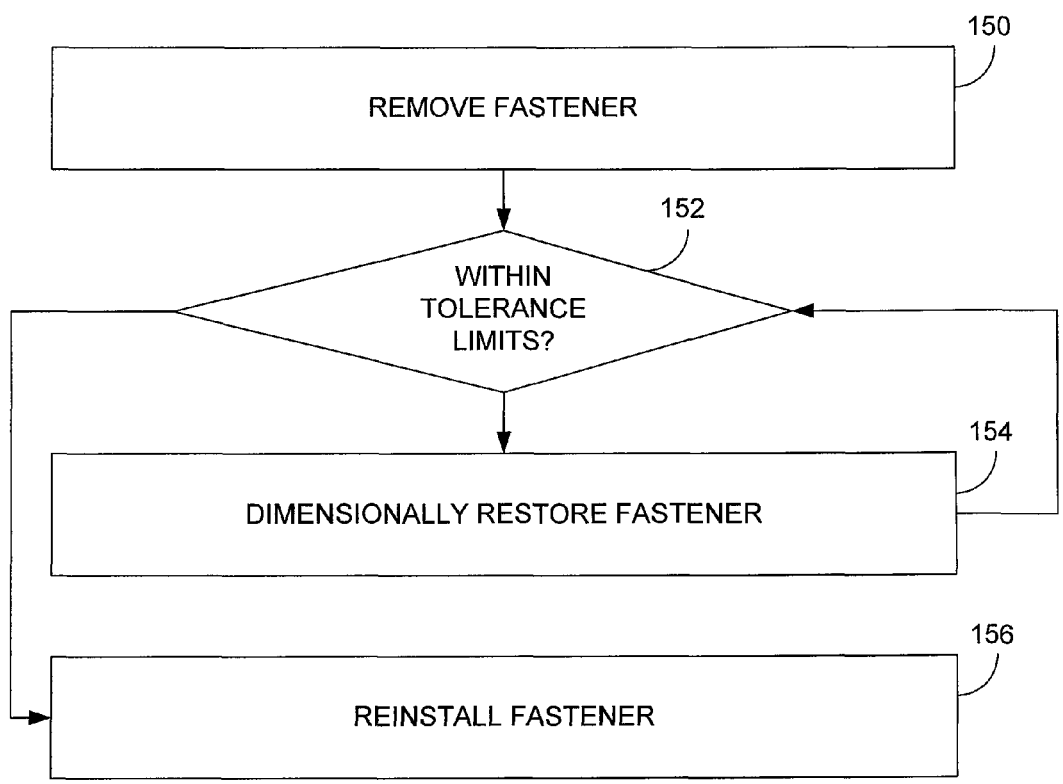
FIG. 5 is a flowchart depicting an exemplary embodiment of a method for dimensionally restoring a fastener.

An exemplary embodiment of a restoration method is depicted in the flowchart FIG. 5. As shown in FIG. 5, the method may be construed as beginning at block 150, in which a mechanical fastener is removed from an engine casing. By way of example, the mechanical fastener can be a body bound bolt or stud mounted within corresponding flange apertures of adjacent engine cases. In block 152, a determination is made as to whether a critical dimension of the fastener is within tolerance limits. If it is determined that the critical dimension is not within tolerance limits, the process may proceed to block 154, in which a corresponding surface of the fastener is dimensionally restored. In some embodiments, dimensional restoration does not involve adding material to the fastener. That is, in some embodiments, only existing material of the fastener is relocated in order to meet the desired tolerance limits. That is, original material of the fastener is relocated and build-up material (e.g., weld material) is not used. In some embodiments, relocation of material can be performed by grit blasting at least a portion of the exterior of the mechanical fastener.

After performing a dimensional restoration technique, the process may return to block 152, in which the critical dimension is analyzed. If it is determined that tolerances have been met, the process may proceed to block 156, in which the dimensionally restored fastener is reinstalled. If however, the tolerances are not met, the process may return to block 154 and proceed as described before.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A method for dimensionally restoring a mechanical fastener for a gas turbine engine comprising:
providing the mechanical fastener that includes a threaded portion and an unthreaded contact portion having a dimension, wherein the fastener has been at least partially worn such that the dimension has decreased from a first value to a second value; and
restoring the dimension of the unthreaded contact portion to the first value by relocating existing material of the fastener.

2. The method of claim 1, wherein the relocating existing material of the fastener is performed without adding material to the fastener.

3. The method of claim 1, wherein the relocating existing material of the fastener comprises grit blasting at least a portion of the contact portion of the fastener.

4. The method of claim 3, wherein, prior to the grit blasting, at least the portion of the contact portion of the fastener is masked.

5. The method of claim 3, wherein the grit blasting is performed manually.

6. The method of claim 3, wherein the grit blasting is performed with a blasting pressure of between approximately 15 PSI and approximately 35 PSI.

7. The method of claim 3, wherein the grit blasting is performed with a blasting pressure of between approximately 20 PSI and approximately 30 PSI.

8. The method of claim 3, wherein the grit blasting is performed with aluminum oxide grit.

9. The method of claim 8, wherein the grit blasting is performed with a grit size of between approximately 50 and 70 grit.

10. The method of claim 8, wherein the grit blasting is performed with a grit size of approximately 60 grit.

11. The method of claim 3, wherein the grit blasting is performed using an incident angle of between approximately 30° and approximately 90°.

12. The method of claim 3, wherein the grit blasting is performed using an incident angle of between approximately 45° and approximately 75°.

13. The method of claim 1, wherein the providing the a mechanical fastener comprises removing the fastener from an engine casing of the gas turbine engine.

14. The method of claim 1, wherein the unthreaded contact portion is operative to contact an aperture of a component to which the fastener is to be attached.

15. The method of claim 1, wherein the fastener is operative to prevent clocking of an engine casing of the gas turbine engine.

16. A method for repairing a gas turbine engine comprising:
removing a fastener from the gas turbine engine, wherein the fastener has a threaded portion and an unthreaded contact portion, and wherein the fastener has been at least partially worn such that a dimension of the unthreaded contact portion has decreased from a first value to a second value;

restoring the dimension of the unthreaded contact portion to the first value by relocating existing material of the fastener; and reinstalling the fastener in the gas turbine engine.

17. The method of claim 16, wherein, in the removing the fastener, the fastener is removed from an engine casing of the gas turbine engine.

18. The method of claim 16, wherein the relocating existing material of the fastener comprises grit blasting at least a portion of the contact portion of the fastener.

* * * * *